Figure 1:
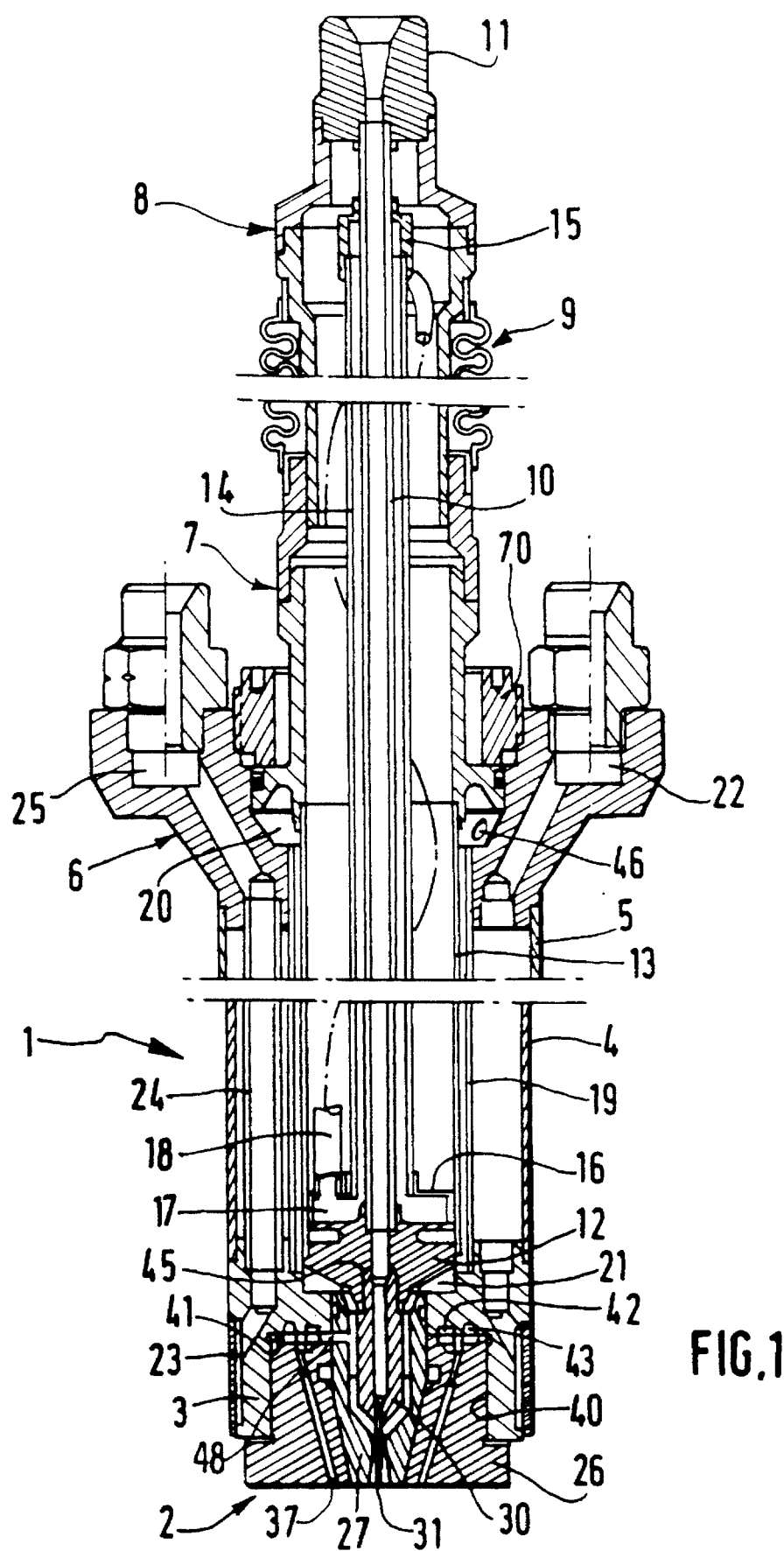

United States Patent [19]

Charbonnel et al.

[11] Patent Number: 5,497,943
[45] Date of Patent: Mar. 12, 1996

[54] OXYGEN CUTTING TORCH WITH A LIQUID OXYGEN JET

[75] Inventors: Jean-Christophe Charbonnel, Nimes; Richard Soula; Serge Suzon, both of Pontoise, all of France

[73] Assignee: L'Air Liquide Societe Anoneyme Pour l'Etude et L'Exploitation des Procedes Georges Claude, Paris, France

[21] Appl. No.: 213,184

[22] Filed: Mar. 15, 1994

[30] Foreign Application Priority Data

Mar. 29, 1993 [FR] France .................................. 93 03603

[51] Int. Cl.⁶ .................................................. B23K 7/10
[52] U.S. Cl. ...................... 239/132; 239/135; 239/419.3; 239/422; 239/424.5; 239/433
[58] Field of Search .......................... 239/139, 419.3, 239/423, 424, 424.5, 290, 296, 422, 135, 433, 552, 600, 132; 266/51, 48, 66

[56] References Cited

U.S. PATENT DOCUMENTS

| | | | |
|---|---|---|---|
| 1,264,581 | 4/1918 | Theberath | 239/138 |
| 1,318,616 | 10/1919 | Smith | 239/424 |
| 2,993,531 | 7/1961 | Spies et al. | 239/424.5 |
| 3,504,856 | 4/1970 | Hinkeldey et al. | 239/132.3 |
| 3,750,958 | 8/1973 | Haselmann | 239/419.3 |
| 4,439,249 | 3/1984 | Singh et al. . | |
| 4,653,731 | 3/1987 | Broden et al. | 266/48 |
| 4,938,455 | 7/1990 | Grohmann . | |
| 5,114,121 | 5/1992 | Arnout et al. | 266/48 |
| 5,165,602 | 11/1992 | Arnout et al. . | |

FOREIGN PATENT DOCUMENTS 1175884  11/1958  France .................. 239/424.5

Primary Examiner—Andres Kashnikow
Assistant Examiner—Kevin Weldon
Attorney, Agent, or Firm—William S. Frommer

[57] ABSTRACT

A torch includes a sheath enclosing various feed streams for active cutting fluids and cooling fluid, terminated by a distribution unit in which a cutting head is removably mounted. The cutting head includes a heating unit provided with channels for ejection of a combustible oxygen mixture, an intermediate insert forming the ejection nozzle for gaseous shielding oxygen, and a central insert for ejection of liquid oxygen under pressure.

12 Claims, 2 Drawing Sheets

OXYGEN CUTTING TORCH WITH A LIQUID OXYGEN JET

The present invention is directed to an oxygen cutting torch with a liquid oxygen jet, including a cutting head with a first ejection channel of reduced cross section, intended to be connected to a liquid oxygen feed stream, extending into a second ejection channel adapted to be connected to a gaseous oxygen feed stream.

An oxygen cutting torch of this type is described in U.S. Pat. No. 5,165,602, assigned to the assignee of the instant invention.

The object of the present invention is to provide an improved oxygen cutting torch with a liquid oxygen jet, including a modular and removable cutting head facilitating replacement of worn elements and making it possible to adapt the configuration readily to various cutting conditions. This enables increased cutting capacities with an integrated system for heating the part to be cut out and guaranteeing effective protection of the cryogenic liquid oxygen line.

To do this, according to one characteristic of the invention, a first channel of the cutting head is formed in a first insert placed in a second insert which defines a second channel exterior of the first channel, and the second insert is placed in a unit or mounting block used to removably mount the cutting head in a distribution unit or block of the torch thereby defining a downstream part of at least the first gaseous oxygen feed stream.

According to other characteristics of the invention:
the unit or mounting block is a heating unit defining at least one ring of heating channels intended to be connected to a second gaseous oxygen feed stream and to a feed stream of combustible gas to eject a combustible oxygen mixture;
the distribution unit or block is mounted at the end of a torch sheath including an exterior tubular envelope into which are fitted parts of the fluid feed streams as well as, typically, a liquid nitrogen feed stream for supercooling the liquid oxygen for cutting.

U.S. Pat. No. 4,938,455 describes an oxygen cutting torch with a liquid oxygen jet but without a removable cutting head with inserts, without shielding of the liquid oxygen jet by a curtain of gaseous oxygen at high speed, and without heating channels.

Figure 2:
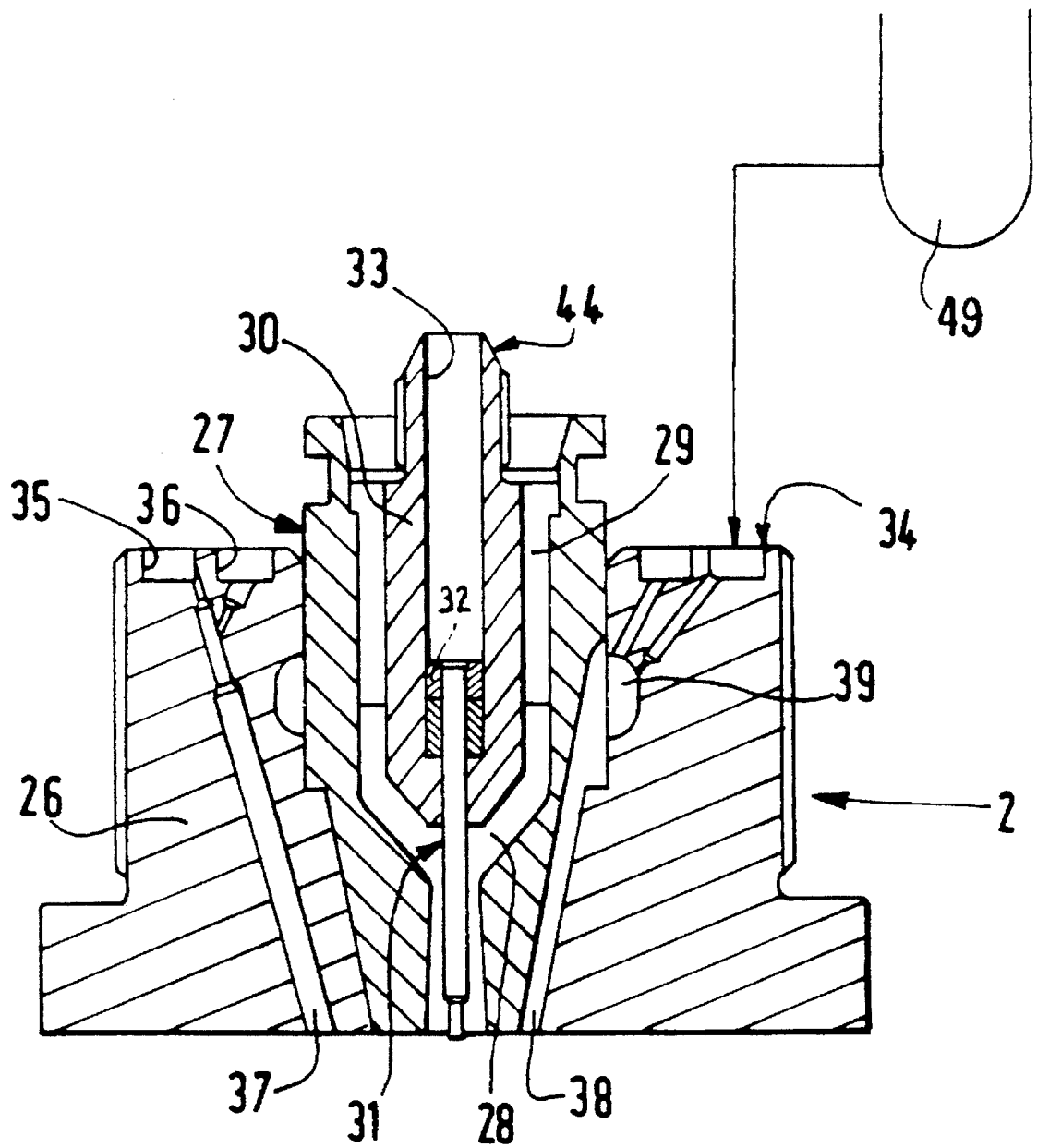

The present invention will be better understood in light of the following description of a preferred embodiment, given for illustrative but in no way limiting purposes, read in conjunction with the accompanying drawings, in which:

FIG. 1 is a longitudinal diagrammatic section of a torch according to the invention; and FIG. 2 is a longitudinal section on a larger scale of the torch cutting head seen in FIG. 1.

As is seen in FIG. 1, a torch according to the present invention includes an elongated cylindrical sheath 1 terminating at one end in a cutting head 2 which is mounted in distribution unit (or block) 3 at the end of sheath 1. Sheath 1 includes an exterior envelope formed by concentric front tube 4 and rear tube 5 that are tightly integral with each other, with distribution block 3 being tightly fastened to the end of front tube 4, with rear tube 5 being tightly fastened to a connector 6. The connector includes channels for connecting the interior feed streams of the torch with exterior fluid feed streams, as will be described below. Into a central borehole of connector 6 there is tightly mounted and fastened with screw nut 70 a front end of anterior tubular structure 7 supporting posterior tubular structure 8 via a stainless steel flexible part 9.

A central tube 10 extends longitudinally the entire length of tubular structures 8 and 7 and of sheath 1. The rear end of tube 10 is fastened into a screw nut 11 mounted tightly onto the rear end of posterior tubular structure 8 and used for connection to thermally insulated tubing for intake of liquid oxygen under pressure (not shown). The front end of tube 10 is mounted tightly into an annular part 12 itself fastened tightly to the end of a tube 13 and placed concentrically inside tubes 4 and 5, around tube 10. The rear end of tube 13 is tightly fastened to the front end of tubular structure 7. A tube 14, axially extended slightly less than tube 10, is placed around the latter and inside tube 13. The rear end of tube 14 is tightly fastened to tube 10 by a coaxial fitting 15, with its front end being tightly connected to annular part 12 by a cap 16 which defines, with the rear face of annular part 12, an annular interior chamber 17, around tube 10. This chamber 17 communicates freely with the tubular passage formed in tube 14 around tube 10. Tubing 18, tightly fastened to cap 16, extends in a spiral wound manner in the interior annular space between tube 14 and tube 13, and then tubular structures 7 and 8, to join fitting 15, with the latter being provided with a connector (not shown) to a feed stream for circulation of liquid nitrogen to cause a liquid nitrogen flux rising in countercurrent into the space between tubes 14 and 10, from interior chamber 17, where the liquid nitrogen flux arrives through tubing 18. According to one aspect of the invention, the interior space between tubes 14 and 13, into which nitrogen intake tubing 18 extends, is kept under a vacuum.

Sheath 1 additionally includes a tube 19 placed around tube 13, with the front end of tube 19 being tightly mounted into a rear borehole of distribution block 3, and the rear end of tube 19 being tightly mounted into a front borehole of connector 6. Tube 19 thus defines with tube 13 a tubular passage joining a rear annular chamber 20 formed around tube 13 and delimited at the rear by tubular structure 7. This tubular passage extends to an anterior annular chamber 21 delimited in the rear part of distribution block 3 by annular part 12. The interior space between tubes 4 and 5 on the one hand and tube 19 form part of a return stream for cooling fluid, such as water, evacuated through an outlet 22 in connector 6 and coming from an annular channel or chamber 23 formed at the periphery of distribution block 3 and supplied with cooling fluid by at least one tube 24 extending into the interior space from a cooling fluid intake 25 provided in connector 6.

As is seen better in FIG. 2, cutting head 2 includes a heating unit 26, also referred to as a mounting block with a central shaped seat passing therethrough into which is mounted tubular insert 27 with a tapered front part and defining an interior channel 28 in the form of a Laval nozzle, as is described in above-mentioned U.S. Pat. No. 5,165,602. A central tubular insert 30 is mounted by means of radial ribs 29 into insert 27, and from this insert 30 a small calibrated tube or needle 31 extends into channel 28 of insert 27. The rear end of tube or needle 31 is integral with a needle-carrier ring 32, itself removably mounted into the central borehole of insert 30. Mounting block 26 includes a flat transverse annular rear face 34 in relation to which inserts 27 and 30 project and which is provided with two concentric grooves 35 and 36 each communicating, in the embodiment shown, with a first and a second series of angularly distributed passages 37 and 38, opening into the front face of block 26 while forming two rings of concentric openings around the ejection orifice of channel 28. In the example shown, passages 37 of the exterior ring are pierced into the volume of block 26 and open into exterior annular groove 35 while communicating through individual passages with interior annular groove 36. Passages 38 of the interior ring are formed by the exterior longitudinal grooves of insert 27, which communicate with an annular mixing throat 39 formed in block 26 and connected by individual passages with annular grooves 35 and 36.

With reference again to FIG. 1, distribution block 3 includes a large threaded borehole 40 opening toward the front and delimited toward the rear by a flat transverse annular face 41, which also includes two concentric annular grooves 42 and 43, which mate with annular grooves 35 and 36 of block 26 and respectively connected to a supply of gaseous combustible material 49 and to a gaseous oxygen intake conduit 48 for intake of combustible material and gaseous oxygen at low pressure, respectively. Annular part 12 has a stepped traversing central passage to receive a rear end of insert 30 projecting beyond insert 27 and with its tapered rear face 44 meeting in tight contact with a corresponding tapered face 45 in the central passage of annular part 12. It will be understood from the preceding description that the removable assembly of block 26 and inserts 27 and 30, themselves individually removable, is put in place in distribution block 3 by cooperation between exterior threading of block 26 and interior threading of borehole 40 until annular faces 34 and 41 come into tight metal-metal contact with each other, with the rear projecting part of central insert 30 being, in this position, in tight contact with the central passage of annular part 12.

During operation, passages 37 and 38 eject a combustible oxygen mixture provided through paired grooves 42, 36 and 43, 35 to form flames for heating the part to be cut. Liquid oxygen, under pressure greater than $100 \times 10^5$ Pa and cooled in tube 10 by the liquid nitrogen in tube 14, arrives through the central passage of annular part 12 and central borehole 33 of central insert 30 to needle 31, from where it is ejected while being shielded by a gaseous oxygen flux ejected at high speed, at pressure greater than 0.15 MPa, through channel 28 (it will be appreciated that channel 28 functions as a nozzle and needle 31 functions as an exhaust nozzle). The shielding oxygen is supplied under pressure from a conduit and enters at 46 into annular chamber 20, and then passes through the space between tubes 13 and 19, annular chamber 21, and the passages between ribs 29 in insert 27.

The arrangement according to the invention, which associates a ring of flames with a liquid oxygen jet sheathed with gaseous oxygen, makes constriction of the liquid oxygen jet possible, thereby increasing its cohesion over a greater length, and permits use of the torch at a greater distance from the part to be cut. This, in turn, contributes to increased safety of the torch relative to heating and against untimely rising of liquid metal scoria. Moreover, this arrangement makes it possible to continue, at admittedly lower speed but without interruption, while increasing pressure of the gaseous sheathing oxygen, a cutting operation in the event of a failure or rupture of the liquid oxygen line under pressure. Sheathing with gaseous oxygen also facilitates igniting of the torch and ensures effective protection of the liquid oxygen ejection needle against heating. As mentioned above, the cutting and heating unit with inserts greatly facilitates torch maintenance while increasing its versatility. Moreover, the possibility of changing the cryogenic line makes it possible to use or not use supercooling of this line with liquid nitrogen, depending on actual needs.

Although the present invention has been described in relation to a particular embodiment, it is not limited thereto but on the contrary is capable of modifications and variations that will be evident to one of ordinary skill in the art.

What is claimed is:

1. An oxygen cutting torch comprising a cutting head having a first ejection channel of reduced cross-section extending into a second ejection channel, said first ejection channel being formed in a first insert disposed in a second insert thereby defining said second ejection channel exterior of said first ejection channel, the second insert containing the first insert being disposed in a unit to removably mount the cutting head in a distribution unit of the torch, means for supplying a liquid oxygen feed stream to said first ejection channel, means for supplying a gaseous oxygen feed stream to said second ejection channel and including a chamber feeding said second election channel, a sheath formed of an exterior tubular envelope, said distribution unit being mounted at an end of said sheath, said means for supplying said liquid oxygen and said gaseous oxygen being housed within said sheath, a central liquid oxygen intake tube extending into said sheath and opening into a central passage of an annular part, said annular part receiving in tight contact a rear end of said first insert, said rear end projecting beyond said second insert, a first tube disposed in said sheath and surrounding the central tube, said first tube being connected to the annular part and forming a section of a supercooling fluid feed stream, a second tube surrounding said first tube and connected to the annular part to define with said first tube an annular vacuum chamber, tubing extending into said vacuum chamber to form a second section of said supercooling fluid feed stream, and a third tube surrounding the second tube and connected to said distribution unit, the third tube defining with said second tube a section of the gaseous oxygen feed stream feeding said chamber.

2. The torch of claim 1, wherein the unit which removably mounts the cutting head defines at least one ring of heating channels connected to receive a second gaseous oxygen feed stream and a combustible material feed stream.

3. The torch of claim 1 wherein the unit which removably mounts the cutting head includes a flat transverse interior annular face meeting in tight contact with a flat transverse interior annular face of the distribution unit, said distribution unit having a central passage therein to receive a rear end of the second insert.

4. The torch of claim 1 wherein said first insert includes a tube of reduced cross-section forming a nozzle for said first ejection channel.

5. The torch of claim 1 wherein the distribution unit includes a cooling channel supplied with a cooling fluid feed stream to said torch.

6. A cutting torch comprising a cutting fluid conduit and at least one gaseous oxygen conduit terminating in a fluid distribution block for mounting a removable cutting head, the cutting head including a first insert having a central passage, a second insert having an inner recess, and a mounting block, the first insert being received within the inner recess of the second insert so as to leave therebetween an annular passage, first gas mixture flow passages extending between the second insert and the mounting block and in fluid flow communication with said gaseous oxygen conduit, the second insert being received within the mounting block, the mounting block carrying connecting means for releasable connection of the cutting head to the distribution block with the central passage of the first insert in fluid flow communication with the cutting fluid conduit, the fluid distribution block including a flat transverse annular surface for cooperation in fluid tight pressure contact with a rear annular surface of the mounting block and formed with a central opening, the second insert having a rear end part protruding outwardly from the rear annular surface of the mounting block and received in the central opening of the fluid distribution block and a combustible gas conduit terminating in the fluid distribution block and in fluid flow communication with the first gas mixture passages.

7. The torch of claim 6, wherein the mounting block is formed with second gas mixture flow passages in fluid flow communication with said gaseous oxygen conduit and with said combustible gas conduit.

8. A cutting torch comprising a cutting fluid conduit in heat-exchange relationship with a first coolant conduit, said cutting fluid being liquid oxygen, and at least one gaseous oxygen conduit terminating in a fluid distribution block for mounting a removable cutting head, the cutting head including a first insert having a central passage, a second insert having an inner recess, and a mounting block, the first insert being received within the inner recess of the second insert so as to leave therebetween an annular passage, and the second insert being received within the mounting block, the mounting block carrying connecting means for releasable connection of the cutting head to the distribution block with the central passage of the first insert in fluid flow communication with the cutting fluid conduit.

9. The torch of claim 8, wherein the first coolant conduit is a conduit for circulating liquid nitrogen.

10. The torch of claim 9, wherein the cutting fluid and the first coolant are at least part housed in a vacuum chamber formed in a torch body having a distal end carrying the distribution block.

11. The torch of claim 10, wherein the torch body further includes a second coolant conduit extending into the distribution block.

12. The torch of claim 8, wherein the first insert carries an ejection tube of reduced inner cross-section protruding outwardly into the inner recess of the second insert and delimiting inwardly the annular passage for the gaseous oxygen.

* * * * *